United States Patent [19]
Silvestri et al.

[11] 3,852,450
[45] Dec. 3, 1974

[54] ANTIBACTERIAL COMPOSITIONS CONTAINING RIFAMPICIN AND A PYRIMIDINE DERIVATIVE

[75] Inventors: Luigi Silvestri, Fara; Vittorio Arioli, Como, both of Italy

[73] Assignee: Gruppo Lepetit S.p.A., Milan, Italy

[22] Filed: Dec. 14, 1972

[21] Appl. No.: 315,107

[30] Foreign Application Priority Data
Dec. 23, 1971  Italy................................ 32838/71

[52] U.S. Cl................................. 424/251, 424/285
[51] Int. Cl....................... A61k 21/00, A61k 27/00
[58] Field of Search............................ 424/251, 285

[56] References Cited
OTHER PUBLICATIONS

Ciba Ltd. – Chem. Abst., Vol. 69, (1968), page 18937V.

Chem. Abst. Subject Index, Vol. 73, (1970), page 3172S.

*Primary Examiner*—Sam Rosen
*Attorney, Agent, or Firm*—Maynard R. Johnson

[57] ABSTRACT

Compositions comprising rifampicin and a pyrimidine compound such as 2,4-diamino-5-(3,4,5-trimethoxybenzyl) pyrimidine exhibit synergistic activity against bacteria.

13 Claims, No Drawings

ANTIBACTERIAL COMPOSITIONS CONTAINING RIFAMPICIN AND A PYRIMIDINE DERIVATIVE

BRIEF SUMMARY OF THE INVENTION

This invention is concerned with new antibacterial compositions and methods. More particularly, the compositions forming the subject of this invention include rifampicin and a pyrimidine derivative of the formula

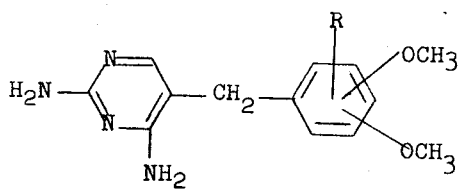

where R represents hydrogen, methoxy or alkyl of one, two or three carbon atoms, or a salt thereof with a pharmaceutically acceptable acid.

The invention includes pharmaceutical compositions containing the above ingredients in suitable oral dosage form, useful in the treatment of bacterial infections in animals. The invention also includes a method useful for combatting bacteria in warm blooded animals by administering an effective amount of each of the above ingredients in such a manner as to provide a simultaneous antibacterial amount of the combination in the blood stream.

The two ingredients have known antibacterial activity in animals, but in combination they exhibit an activity which is by far higher than the expected sum of activities of the individual components.

The invention can also be employed to combat bacterial infections in animals by microorganisms resistant to one or other of the two ingredients of the composition.

Suitable pyrimidines of the above generic formula for inclusion in the preparations forming the subject of the invention are, for instance, 2,4-diamino-5-(3,4,5-trimethoxybenzyl)-pyrimidine, 2,4-diamino-5-(3,4-dimethoxy-6-methylbenzyl)-pyrimidine, 2,4-diamino-5-(3,4-dimethoxybenzyl)-pyrimidine, 2,4-diamino-5-(2,6-dimethoxybenzyl)-pyrimidine, 2,4-diamino-5-(2,4-dimethoxybenzyl)-pyrimidine, and their salts with pharmaceutically acceptable acids. The salts preferably include salts with mineral acids, such as hydrochloric acid and sulfuric acid, and organic acids, such as formic acid, acetic acid, succinic acid and so on.

DESCRIPTION OF PREFERRED EMBODIMENTS

As above stated, the two components of the pharmaceutical compositions can be embodied into a suitable oral dosage form. The two components can also be administered individually, i.e., without including both of them into a single dosage form. In fact, the same antibacterial effect can be reached by giving the two components separately in the same doses in which they are incorporated to prepare the compositions of this invention. It is intended, however, that the separate administration of the two ingredients, either simultaneously or at time intervals close enough together to give simultaneous serum levels of the two ingredients sufficient to provide antibacterial results, falls within the purpose of this invention. When it is desired to administer the compounds separately, the time intervals to be employed can vary depending on dosage, dosage form, species of animal, type of infection, etc. In particular cases the time intervals can be established by known techniques such as conventional range finding studies, blood level studies, and the like. In a convenient procedure the rifampicin and the pyrimidine components are administered orally to a mammal from 0 to about 60 minutes apart, simultaneous administration being preferred.

In the method and composition of the invention, the two ingredients can be employed in a ratio of from about 0.2 to about 15 parts by weight of rifampicin to each part by weight of the pyrimidine compound to provide antibacterial action. Synergistic antibacterial activity is obtained with intermediate ratios of rifampicin to pyrimidine, such as 0.3 to 1, 0.5 to 1, 1 to 1, 2 to 1 and 5 to 1 and intermediate ranges of ratios such as from about 0.3 to about 3.33 parts rifampicin per part of pyrimidine compound; from about 0.45 to about 5 parts rifampicin per part of the pyrimidine; or from about 0.2 to about 2.25 parts rifampicin per part of the pyrimidine compound. The amount of the combination to be administered to provide an antibacterial effect can vary depending on severity and type of infection, species of animal, frequency of administration, etc. Oral dosages from about 45 to about 225 milligrams of total combination per kilogram of animal body weight can be employed. The desired dosage in particular cases can be determined by conventional techniques.

The dosage forms are prepared by common procedures. For example, the ingredients can be admixed with each other and compressed into single or multilayer tablets. Coated or hardshell capsules can also be prepared. Other ingredients can be added to the two-component mixture, selected from those usually employed for the preparation of the desired dosage form. Thus, the oral dosage forms may include diluents such as starch and/or lactose and/or dextrose, disintegrating agents such as maize starch; and lubricating agents such as stearic acid, sodium or calcium stearate, talc and others. Other forms of administration comprise suspensions or solutions for oral use, for instance syrups, in which the insoluble ingredients are suspended by the aid of acacia gum, tracaganth and so on. The concentration will then be calculated to provide as the individual dosage unit a convenient volume for oral administration to the animal.

The active ingredients of the compositions can be combined in a wide range of mutual ratios. Generally 1 part by weight of the pyrimidine of the foregoing generic formula can be associated with from about 0.2 to 5, to 10 parts by weight of rifampicin. A preferred composition includes 1 part of the pyrimidine compound and from about 0.5 to about 3 parts by weight of rifampicin.

A single unit dose conveniently contains from 10 to 100 milligrams of the pyrimidine compound and from 25 to 500 milligrams of rifampicin. The unit dose may be administered to animals from 1 to 4 times a day and more, depending upon such factors as the severity of the infection, the infecting organism, the size, weight, age, species, and physical condition of the animal, and the individual tolerance by the animal. In this respect, however, it has been ascertained that the toxicity of the mixtures is not higher than that of the individual components in any mutual dosage ratio. The above indicated dosages are given for purpose of example only, and do not limit the scope of the invention.

In order to demonstrate the activity of the combinations forming the subject of this invention, albino mice were infected with 100 minimum lethal doses of *Salmonella typhimurium*, *Escherichia coli*, *Proteus vulgaris* and *Shigella dysenteriae*. Three groups of mice were then treated orally with water suspensions respectively of (a) rifampicin, (b) 2,4-diamino-5-(3,4,5-trimethoxybenzyl)-pyrimidine and (c) both rifampicin and 2,4-diamino-5-(3,4,5-trimethoxybenzyl)-pyrimidine in various amounts. The following tables give the results obtained.

TABLE 1

| Organism | Dose mg/kg | % survival | Dose mg/kg | % survival |
|---|---|---|---|---|
| | A Rifampicin | | A + B | |
| Salmonella typhimurium | 90 | 30 | 90  90 | 95 |
| | 60 | 0 | 90  60 | 85 |
| | 40 | 0 | 90  40 | 80 |
| | 27 | 0 | 90  27 | 95 |
| | B | | 60  90 | 90 |
| | 2,4-Diamino-5-(3,4,5-trimethoxybenzyl)-pyrimidine | | 60  60 | 75 |
| | | | 60  40 | 50 |
| | 90 | 0 | 60  27 | 50 |
| | 60 | 0 | 40  90 | 45 |
| | 40 | 0 | 40  60 | 35 |
| | 27 | 0 | 40  40 | 20 |
| | | | 40  27 | 30 |
| | | | 27  90 | 25 |
| | | | 27  60 | 20 |
| | | | 27  40 | 25 |
| | | | 27  27 | 0 |

TABLE 2

| Organism | Dose mg/kg | % survival | Dose mg/kg | % survival |
|---|---|---|---|---|
| | A | | A + B | |
| Escherichia coli | 90 | 30 | 90  60 | 100 |
| | 60 | 15 | 90  40 | 70 |
| | 40 | 5 | 90  27 | 65 |
| | 27 | 5 | 90  18 | 70 |
| | | | 60  60 | 80 |
| | B | | 60  40 | 40 |
| | 90 | 35 | 60  27 | 35 |
| | 60 | 15 | 60  18 | 55 |
| | 27 | 5 | 40  60 | 80 |
| | 18 | 5 | 40  40 | 65 |
| | | | 40  27 | 65 |
| | | | 40  18 | 45 |
| | | | 27  60 | 90 |
| | | | 27  40 | 65 |
| | | | 27  27 | 35 |
| | | | 27  18 | 35 |

TABLE 3

| Organism | Dose mg/kg | % survival | Dose mg/kg | % survival |
|---|---|---|---|---|
| | A | | A + B | |
| Proteus vulgaris ATCC 889 | 90 | 40 | 90  135 | 100 |
| | 60 | 10 | 90  90 | 85 |
| | 40 | 5 | 90  60 | 95 |
| | 27 | 5 | 90  40 | 95 |
| | | | 60  135 | 100 |
| | B | | 60  90 | 85 |
| | 135 | 60 | 60  60 | 70 |
| | 90 | 35 | 60  40 | 55 |
| | 60 | 20 | 40  135 | 75 |
| | 40 | 5 | 40  90 | 50 |
| | | | 40  60 | 45 |
| | | | 40  40 | 30 |

TABLE 3-Continued

| Organism | Dose mg/kg | % survival | Dose mg/kg | % survival |
|---|---|---|---|---|
| | | | 27  135 | 90 |
| | | | 27  90 | 55 |
| | | | 27  60 | 35 |
| | | | 27  40 | 10 |

TABLE 4

| Organism | Dose mg/kg | % survival | Dose mg/kg | % survival |
|---|---|---|---|---|
| | A | | A + B | |
| Shigella dysenteriae ATCC 9583 | 90 | 40 | 90  60 | 95 |
| | 60 | 5 | 90  40 | 98 |
| | 40 | 0 | 90  27 | 100 |
| | 27 | 2 | 90  18 | 100 |
| | | | 60  60 | 100 |
| | B | | 60  40 | 100 |
| | 60 | 35 | 60  27 | 95 |
| | 40 | 35 | 60  18 | 100 |
| | 27 | 25 | 40  60 | 80 |
| | 18 | 15 | 40  40 | 85 |
| | | | 40  27 | 80 |
| | | | 40  18 | 80 |
| | | | 27  60 | 75 |
| | | | 27  40 | 50 |
| | | | 27  27 | 40 |
| | | | 27  18 | 38 |

The following examples of formulation are given for purpose of illustration only, and are not meant to limit the scope of the invention.

EXAMPLE 1

A tablet is prepared from:

| | |
|---|---|
| Rifampicin | 200 mg |
| 2,4-Diamino-5-(3,4,5-trimethoxybenzyl)-pyridine | 100 mg |
| Starch | 50 mg |
| Lactose | 50 mg |
| Stearic acid | 5 mg |
| Gelatin | 15 mg. |

The two active ingredients and the lactose are mixed and granulated with a water solution of the gelatin. After drying the granulate is blended with the starch amid compressed to give a tablet at about 420 mg.

EXAMPLE 2

A capsule is prepared by thoroughly admixing:

| | |
|---|---|
| Rifampicin | 150 mg |
| 2,4-Diamino-5-(3,4,5-trimethoxybenzyl)-pyridine | 150 mg |
| Dextrose | 100 mg |
| Magnesium stearate | 10 mg. |

The mixture is filled into hard shell gelatin capsules of suitable size.

EXAMPLE 3

A tablet is prepared by using the same procedure described in Example 1, from the following ingredients:

| | |
|---|---|
| Rifampicin | 250 mg |
| 2,4-Diamino-5-(3,4,5-trimethoxybenzyl)-pyrimidine sulfate | 50 mg |

| | |
|---|---|
| -Continued | |
| Starch | 70 mg |
| Talc | 10 mg |
| Magnesium stearate | 5 mg. |

EXAMPLE 4

A tablet is prepared by using the same procedure described in Example 1, from the following ingredients:

| | |
|---|---|
| Rifampicin | 50 mg |
| 2,4-Diamino-5-(3,6-dimethoxybenzyl)-pyrimidine hydrochloride | 100 mg |
| Dextrin | 50 mg |
| Stearic acid | 5 mg |
| Talc | 5 mg. |

The rifampicin component of the invention (also known as "rifampin") is the 3-(4-methylpiperazinyliminomethyl)hydrazone of rifamycin S.V. The rifampicin and the pyrimidine compounds can both be prepared by known procedures.

What is claimed is:

1. A composition comprising a pyrimidine compound selected from a compound corresponding to the formula:

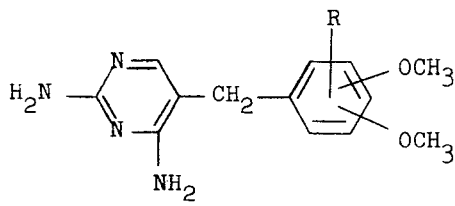

wherein R represents hydrogen, methoxy or lower alkyl, and the salts thereof with pharmaceutically acceptable acids; and from about 0.2 to about 10 parts by weight of rifampicin per part by weight of the pyrimidine compound.

2. A composition of claim 1, wherein the pyrimidine compound is 2,4-diamino-5-(3,4,5-trimethoxybenzyl)-pyrimidine.

3. A composition of claim 2 comprising from about 0.2 to about 5 parts of rifampicin per part of the pyrimidine compound.

4. A composition of claim 1 in the form of a dosage unit containing from about 10 to about 100 milligrams of the pyrimidine compound and from about 25 to about 500 milligrams of rifampicin per unit.

5. A method comprising orally administering to a warm blooded animal a pyrimidine compound selected from a compound corresponding to the formula

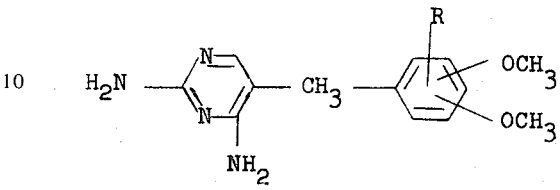

wherein R represents hydrogen, methoxy or lower alkyl, and the salts thereof with pharmaceutically acceptable acids, and orally administering to the animal from about 0.2 to about 10 parts by weight of rifampicin per part by weight of the pyrimidine compound in a manner effective to provide an antibacterial amount of the resulting combination in the blood stream of the animal.

6. The method of claim 5 wherein the pyrimidine compound is 2,4-diamino-5-(3,4,5-trimethoxybenzyl)-pyrimidine.

7. The method of claim 6 wherein from about 0.2 to about 5 parts by weight of rifampicin are administered per part by weight of the pyrimidine compound.

8. The method of claim 7 wherein the pyrimidine compound and the rifampicin are administered in amounts sufficient to provide a total dosage of from about 45 to about 225 milligrams per kilogram.

9. The method of claim 8 wherein the pyrimidine compound and the rifampicin are administered substantially simultaneously to a mammal infected with bacteria.

10. The method of claim 6 wherein the animal is a mammal infected with *Salmonella typhimurium*.

11. The method of claim 6 wherein the animal is a mammal infected with *Shigella dysenteriae*.

12. The method of claim 6 wherein the animal is a mammal infected with *Escherichia coli*.

13. The method of claim 6 wherein the animal is a mammal infected with *Proteus vulgaris*.

* * * * *